United States Patent [19]

Falk et al.

[11] Patent Number: 5,092,404
[45] Date of Patent: Mar. 3, 1992

[54] POLYVINYL SULFONATE SCALE INHIBITOR

[75] Inventors: David O. Falk; Frank L. Dormish, both of Denver; Phillip M. Beazley, Conifer; Ronald G. Thompson, Longmont, all of Colo.

[73] Assignee: Marathon Oil Company, Findlay, Ohio

[21] Appl. No.: 646,503

[22] Filed: Jan. 22, 1991

Related U.S. Application Data

[63] Continuation of Ser. No. 431,262, Nov. 1, 1989, abandoned.

[51] Int. Cl.$^5$ ............ E21B 47/00; E21B 37/06
[52] U.S. Cl. ............ 166/250; 166/279; 166/310; 166/902; 210/698; 210/747
[58] Field of Search ............ 166/244.1, 250, 279, 166/310, 371, 902; 210/698–701; 252/180

[56] References Cited

U.S. PATENT DOCUMENTS

| | | | |
|---|---|---|---|
| 3,913,678 | 10/1975 | Blount et al. | 166/902 |
| 4,602,683 | 7/1986 | Meyer | 166/244.1 |
| 4,710,303 | 12/1987 | Emmons | 210/698 |
| 4,789,030 | 12/1988 | Delude et al. | 166/902 |
| 4,817,722 | 4/1989 | Montfort et al. | 166/310 |
| 4,923,617 | 3/1990 | Hellwelt et al. | 210/698 |

FOREIGN PATENT DOCUMENTS

1495761 2/1970 Fed. Rep. of Germany.
2213175 8/1989 United Kingdom.

OTHER PUBLICATIONS

B. J. Burr et al., The Development and Application of a Detectable Polymeric Scale Inhibitor to Control Sulfate Scales by Squeeze Applications, SPE 16261, SPE International Symposium on Oilfield Chemistry, San Antonio, Tex., Feb. 4–6, 1987, pp. 195–204.

M. J. Boyle et al., Scale Inhibition Problems Associated with North Sea Oil Production, OF-79, SPF 8164, Offshore Europe 79 Confeence, Aberdeen, Scotland, Sep. 3–7, 1979, pp. 8164.1–8164.11.

M. C. van der Leeden et al., Inhibition of Barium Sulfate Deposition by Polycarboxylates of Various Molecular Structure, SPE 1914, Society of Petroleum Engineers, 1988, 11 pages.

G. R. Chesnut et al., The Development of Scale Inhibitors and Inhibitor Evaluation Techniques for Carbon Dioxide EOR Flood, SPE 16260, SPE International Symposium on Oilfield Chemistry, San Antonio, Tex., Feb. 4–6, 1987, pp. 187–193.

K. C. Petty, Chemical Inhibit Scale Deposits, *Petroleum Engineer International*, Jun. 1989, pp. 22–25.

*Primary Examiner*—Peter Hruskoci
*Attorney, Agent, or Firm*—Jack L. Hummel; Jack E. Ebel

[57] ABSTRACT

A relatively high molecular weight polyvinyl sulfonate and a process for inhibiting scale deposition, particularly inorganic sulfate such as barium sulfate, wherein an aqueous fluid present in or produced from a subterranean formation is contacted with an aqueous solution having a relatively high molecular weight polyvinyl sulfonate dissolved therein. The aqueous fluid has a pH equal to or less than 6.0 and the polyvinyl sulfonate has a molecular weight of from about 9,000 to about 30,000.

36 Claims, 4 Drawing Sheets

POLYVINYL SULFONATE SCALE INHIBITOR

This application is a continuation application of co-pending application Ser. No. 07/431,262 filed on Nov. 1, 1989 now abandoned.

BACKGROUND OF THE INVENTION

The present invention relates to a relatively high molecular weight polyvinyl sulfonate and to a process for inhibiting scale deposition, particularly inorganic sulfate such as barium sulfate, in a subterranean formation utilizing an aqueous solution having the relatively high molecular weight polyvinyl sulfonate dissolved therein.

Precipitation of inorganic salts, such as calcium carbonate and calcium, barium, and strontium sulfate, as scale deposits is a persistent and common problem encountered in many field operations for the recovery of hydrocarbons from subterranean formations. Commingling of incompatible aqueous fluids during field operations, especially enhanced oil recovery (EOR) operations involving a waterflood or water drive, results in scale formation and deposition in the formation and in production equipment and tubing. Two or more aqueous fluids are incompatible if each fluid contains distinct ions which form a precipitate and deposit as a scale when the two or more aqueous fluids are commingled. Usually the connate water or brine present in a reservoir will contain barium, calcium and/or strontium ions while water injected into the subterranean formation during EOR operations will contain sulfate ions. For example, offshore operations may involve the injection of large volumes of sea water containing a relatively large concentration of sulfate ions into a subterranean formation having brine containing relatively large concentrations of barium, calcium, and strontium. Upon mixing of the aqueous fluids in situ, precipitation of barium, calcium, or strontium sulfate will occur in the formation and the subsurface and surface production equipment and/or tubing. Commingling of incompatible aqueous fluids usually occurs within the near production well bore environment of a subterranean formation.

Injection of carbon dioxide into a subterranean hydrocarbon-bearing formation as an EOR method results in absorption of carbon dioxide by connate water present in the formation. In addition, some subterranean formation brines, such as those found in the North Sea, may naturally contain a relatively large concentration of carbon dioxide. As pressure is reduced, for example during production, carbon dioxide flashes off to the gas phase thereby increasing the pH of the aqueous fluids and permitting formation of calcium carbonate scale predominantly in the near production well bore environment of the formation and in subsurface and surface production equipment and/or tubing.

Conventional removal of scale formed within a subterranean formation and the subsurface and surface production equipment and tubing is costly and ineffective. Scale removal by repeated injection of a chemical agent is relatively expensive. Thus, scale has been removed utilizing various mechanical devices, such as impact jets and/or cavitation jets. As the downtime associated with pulling production tubing and cleaning such tubing above ground is expensive, particularly in offshore locations, wells are cleaned downhole after killing the well. Such mechanical cleaning is timeconsuming, relatively inefficient, and potentially hazardous where a radioactive precipitate, for example radium sulfate, is present in the scale to be removed.

Inhibition of scale deposition has been advanced as a more feasible, and accordingly preferable, approach to effectively reducing scale deposition. Conventional commercial scale inhibitors consist primarily of polyelectrolytes, such as polycarboxylates or polyphosphonates. However, the effectiveness of such polyelectrolyte scale inhibitors significantly depends upon the degree of ionization of these inhibitors at the pH value of connate waters. At relatively low pH values, e.g. equal to or less than about 6.0, the effectiveness of a conventional polyelectrolyte scale inhibitor to inhibit barium, calcium, or strontium sulfate scale formation significantly decreases. In addition, conventional polyelectrolyte scale inhibitors utilized to inhibit inorganic sulfate scale dissolve calcium carbonate scale thereby increasing calcium ion concentration which causes undesirable precipitation of the conventional polyelectrolyte scale inhibitors. Thus, a need exists for a scale inhibitor for use in subterranean formations which effectively inhibits the formation of scale, particularly inorganic sulfate such as barium sulfate, in relatively low pH environments, such as a pH of about 6.0 and below.

Accordingly, it is an object of the present invention to provide a novel scale inhibitor which will effectively inhibit the formation of scale, particularly inorganic sulfate such as barium sulfate, in aqueous fluid present in and/or produced from a subterranean formation.

It is another object of the present invention to provide a scale inhibitor which does not dissolve carbonate scale to any appreciable degree when injected into a subterranean formation via a well bore in fluid communication therewith.

It is a further object of the present invention to provide a process for inhibiting scale formation, particularly inorganic sulfate such as barium sulfate, from fluids having a pH equal to or less than 6.0 which are present in and/or produced from a subterranean formation.

SUMMARY OF THE INVENTION

The present invention provides a process for inhibiting scale deposition, particularly inorganic sulfate deposition, from aqueous fluid present in and/or produced from a subterranean formation by contacting such fluid with an aqueous solution having a novel, relatively high molecular weight polyvinyl sulfonate dissolved therein. The polyvinyl sulfonate has a molecular weight of from about 9,000 to about 30,000, preferably from 10,500 to about 25,000, and more preferably from about 12,000 to about 20,000. Preferably, the polyvinyl sulfonate has a polydispersity of less than about 2.0. The aqueous fluid is contacted with the aqueous solution having polyvinyl sulfonate dissolved therein, for example by means of a squeeze treatment via a production well bore in fluid communication with the formation. The polyvinyl sulfonate of the present invention is dissolved in an aqueous solution in an amount of from about 0.4 to about 25 volume percent of the total solution. The pH of the aqueous fluid is equal to or less than 6.0.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

The present invention relates to a scale inhibitor composition comprising an aqueous solution having a relatively high molecular weight polyvinyl sulfonate dissolved therein and to a process which employs this scale inhibitor composition to effectively inhibit the deposition of scale, particularly inorganic sulfate scale, from aqueous fluids present in a subterranean formation and subsurface and/or surface hydrocarbon production tubing and/or equipment. As utilized throughout this specification, the term "molecular weight" refers to the weight average molecular weight of polyvinyl sulfonate. The weight average molecular weight is determined from experiments in which each molecule or chain makes a contribution to the measured result. The weight average molecular weights reported in this specification were determined using a size exclusion chromatographic determination of molecular weights which employed a column packed with a polymeric gel. As also utilized throughout this specification, the term "polydispersity" refers to the weight average molecular weight of polyvinyl sulfonate divided by the number average molecular weight of polyvinyl sulfonate. The number average molecular weight is calculated by dividing the sum of the individual molecular weight values by the number of molecules.

In accordance with the present invention, an aqueous solution having a relatively high molecular weight polyvinyl sulfonate dissolved therein is injected into a subterranean formation via a production well in fluid communication therewith to effectively inhibit scale formation in aqueous fluids present in the formation and/or in surface and subsurface production tubing and/or equipment when the well is returned to production. Applicants have discovered that utilizing a polyvinyl sulfonate having a molecular weight of from about 9,000 to about 30,000 results in an unexpected improvement in the inhibition of scale, particularly inorganic sulfate scale such as barium sulfate, from these aqueous fluids. The polyvinyl sulfonate of the present invention has a molecular weight of from about 9,000 to about 30,000, more preferably from about 10,500 to about 25,000, and most preferably from about 12,000 to about 20,000. Preferably, the polyvinyl sulfonate of the present invention has a polydispersity of less than about 2.0. The polyvinyl sulfonate of the present invention is thermally stable. The polyvinyl sulfonate scale inhibitor of the present invention is prepared by polymerizing a commercially available aqueous solution of vinyl sulfonic acid, sodium salt, such as that manufactured by Air Products & Chemicals, Inc., Aldrich Chemical Co., Inc. or Farbwerke Hoechst AG. For example, 25 and 30 weight percent aqueous solutions of vinyl sulfonic acid, sodium salt, are commercially available from Air Products & Chemicals, Inc. and Farbwerke Hoechst AG, respectively. As received the vinyl sulfonic acid, sodium salt, solution may contain a polymerization inhibitor, e.g. 100 ppm of methylether hydroquinone. In such cases, the particular polymerization inhibitor employed can be extracted by passing the monomer, i.e. the vinyl sulfonic acid, sodium salt, slowly through a column packed with a suitable resin as will be evident to a skilled artisan. The monomer solution is purged for about an hour with nitrogen at room temperature while the solution is stirred to remove oxygen therefrom. A suitable catalyst, such as ammonium persulfate, is also purged with the nitrogen and then added to the monomer solution at room temperature. The resulting solution is continually stirred at room temperature for a sufficient period to allow for maximum conversion of the monomer to polyvinyl sulfonate. Thereafter, if the resultant polymerization solution contains deleterious by-products of sulfonation, such as sulfate ions or hydroxyethyl sulfonate, polyvinyl sulfonate can be separated from these deleterious by-products of sulfonation by any suitable method as will be evident to the skilled artisan. Preferably this separation is accomplished by the addition of methanol to effect a liquid/liquid separation of polyvinyl sulfonate from the solution containing deleterious by-products of sulfonation. This method is described in a commonly assigned, co-pending patent application entitled "Process for Recovering and Purifying a High Molecular Weight Sulfonate" to Richard T. Barthorpe which was filed concurrently herewith.

The polyvinyl sulfonate scale inhibitor of the present invention is incorporated into an aqueous solution in an amount effective to inhibit the formation of scale in aqueous fluids present in and/or produced from a subterranean formation. The aqueous solution may be a brine which preferably contains a low concentration of sulfate ions. The aqueous solution having the polyvinyl sulfonate scale inhibitor of the present invention dissolved therein can be introduced into contact with aqueous fluids present in a subterranean formation and/or in surface and/or subsurface production tubing and/or equipment in any suitable manner known to those skilled in the art such as, by metering into aqueous fluid present in a production well bore through a small diameter tube, e.g. ¼-1 inch, by injection through a gas lift valve, or by introducing encapsulated polyvinyl sulfonate into a production well bore. However, it is preferred to squeeze the aqueous solution having polyvinyl sulfonate dissolved therein into a subterranean formation. In accordance with a squeeze technique, an aqueous solution of the polyvinyl sulfonate of the present invention is injected into a subterranean formation via a production well bore in fluid communication therewith and can be followed by an overflush, for example a brine containing a relatively low quantity of sulfate ions, i.e. a brine which is compatible with formation fluids. The production well bore may be shut in for a suitable period, for example, zero to twentyfour hours, and thereafter is returned to production. The polyvinyl sulfonate is absorbed within formation matrix during the shut-in period and is subsequently desorbed over a period of time into aqueous fluids present in and produced from the formation to effectively inhibit scale deposition, particularly inorganic sulfate scale such as barium sulfate scale. The polyvinyl sulfonate of the present invention should be incorporated into an aqueous solution to be squeezed into a subterranean formation in an amount of from about 0.4 to about 25 volume percent, more preferably in an amount of from about 2 to about 20 volume percent, and most preferably in an amount of from about 5 to about 10 volume percent, of the solution to effectively inhibit scale formation upon being desorbed into aqueous fluids present in and produced from the formation. As previously mentioned, the aqueous solution may be a brine which preferably contains a low concentration of sulfate ions. Subsequent to the squeeze treatment, aqueous fluids produced from the subterranean formation will be analyzed for inhibitor concentration to ensure that an appropriate concentration of inhibitor is present in produced fluids to effectively inhibit scale deposition and to determine the need for subsequent squeeze treatments.

The process of the present invention can be utilized to inhibit scale, particularly inorganic sulfate scale such as barium sulfate scale, from aqueous fluids contained in and/or produced from any subterranean formation in which incompatible aqueous fluids may commingle, for example, during an EOR operation, and/or in which the aqueous fluids present in the formation contain a relatively large concentration of carbon dioxide. Preferably, the polyvinyl sulfonate scale inhibitor and process of the present invention are employed to effectively inhibit scale from aqueous fluids present in or produced from a subterranean formation which have a pH equal to or less than about 6.0 and more preferably equal to or less than about 4.0. The process of the present invention is applicable to a wide variety of subterranean formation temperatures and mineralogies.

The following examples demonstrate the practice and utility of the present invention, but are not to be construed as limiting the scope thereof.

EXAMPLE 1

A 25 wt % solution of vinyl sulfonic acid, sodium salt manufactured by Aldrich Chemical Co., Inc. is passed through a resin column to remove methylether hydroquinone which is employed as a polymerization inhibitor for the vinyl sulfonic acid, sodium salt monomer during transportation. 1000 g of vinyl sulfonic acid, sodium salt is charged to a reaction flask and is purged with nitrogen at room temperature for one hour while stirring to remove oxygen therefrom. Ammonium persulfate is added to 25 ml of nitrogen purged distilled water in an amount to obtain an ammonium persulfate concentration of 0.1 g/ml. The mixture is then heated to 50° C. 3.0 ml of the resultant ammonium persulfate solution is injected into the monomer solution present in the reaction flask and the resultant solution is stirred and allowed to polymerize at 50° C. with a nitrogen purge for twenty-four hours. This reaction results in 100% conversion of the monomer to a polyvinyl sulfonate which is determined to have a molecular weight of about 9,109 and a polydispersity of about 1.79.

EXAMPLE 2

The polymerization reaction set forth in Example 1 is repeated except that the vinyl sulfonic acid, sodium salt charged to the reactor is reduced to 100 g the concentration of ammonium persulfate present in the reaction, solution is increased to 0.50 mg/ml, the reaction temperature is reduced to room temperature, i.e. 22.2° C., and the reaction time is reduced to eight hours. This polymerization reaction results in 53.2% conversion of monomer to a polyvinyl sulfonate which is determined to have a molecular weight of about 13,565 and a polydispersity of about 2.0.

EXAMPLE 3

The polymerization reaction set forth in Example 2 is repeated except that the concentration of ammonium persulfate catalyst employed in the reaction solution is increased to 1.0 mg/ml and the reaction time is extended to three days. This polymerization reaction results in a 78% conversion of monomer to a polyvinyl sulfonate which is determined to have a molecular weight of about 15,542 and a polydispersity of about 1.99.

EXAMPLE 4

The polymerization reaction of Example 2 is repeated except that the concentration of ammonium persulfate catalyst employed in the reaction solution is decreased to 0.25 mg/ml and the reaction time is increased to twenty-four hours. This polymerization reaction results in a 68% conversion of monomer to a polyvinyl sulfonate which is determined to have a molecular weight of about 16,269 and a polydispersity of about 1.70.

EXAMPLE 5

The polymerization reaction of Example 2 is repeated except that the concentration of ammonium persulfate catalyst employed in the reaction solution is increased to 1.0 mg/ml, a co-catalyst, triethanolamine, is also employed at a concentration of 1.2 wt % in the reaction solution, and the reaction time is increased to twenty-four hours. This polymerization reaction results in a 22% conversion of monomer of a polyvinyl sulfonate which is determined to have a molecular weight of about 18,887 and a polydispersity of about 1.82.

EXAMPLE 6

The polymerization reaction of Example 2 is repeated except that the concentration of ammonium persulfate catalyst employed in the reaction solution is decreased to 0.25 mg/ml and the reaction time is increased to five days. This polymerization reaction results in a 72% conversion of monomer to a polyvinyl sulfonate which is determined to have a molecular weight of about 18,902 and a polydispersity of about 1.81.

EXAMPLE 7

The polymerization reaction of Example 2 is repeated except that a 37.5 wt % solution of vinyl sulfonic acid, sodium salt, is utilized in lieu of a 25% solution, the concentration of ammonium persulfate catalyst present in the reaction solution is decreased to 0.25 mg/ml and the reaction time is increased to three days. This polymerization procedure should result in an adequate conversation of monomer to a polyvinyl sulfonate which is determined to have a molecular weight approximating 25,000 and a polydispersity of less than about 2.0.

EXAMPLE 8

The polymerization reaction of Example 2 is repeated except that a 50 wt % solution of vinyl sulfonic acid, sodium salt, is utilized in lieu of a 25% solution, the concentration of ammonium persulfate catalyst present in the reaction solution is decreased to 0.25 mg/ml, and the reaction time is increased to three days. This polymerization procedure should result in an adequate conversation of monomer to a polyvinyl sulfonate which is determined to have a molecular weight approximating 30,000 and a polydispersity of less than about 2.0.

The foregoing examples demonstrate the polymerization process to be employed to obtain a polyvinyl sulfonate having a molecular weight of from about 9,000 to about 30,000 which is useful as an improved scale inhibitor, especially for barium sulfate scale, in accordance with the present invention.

EXAMPLE 9

Figure 1:
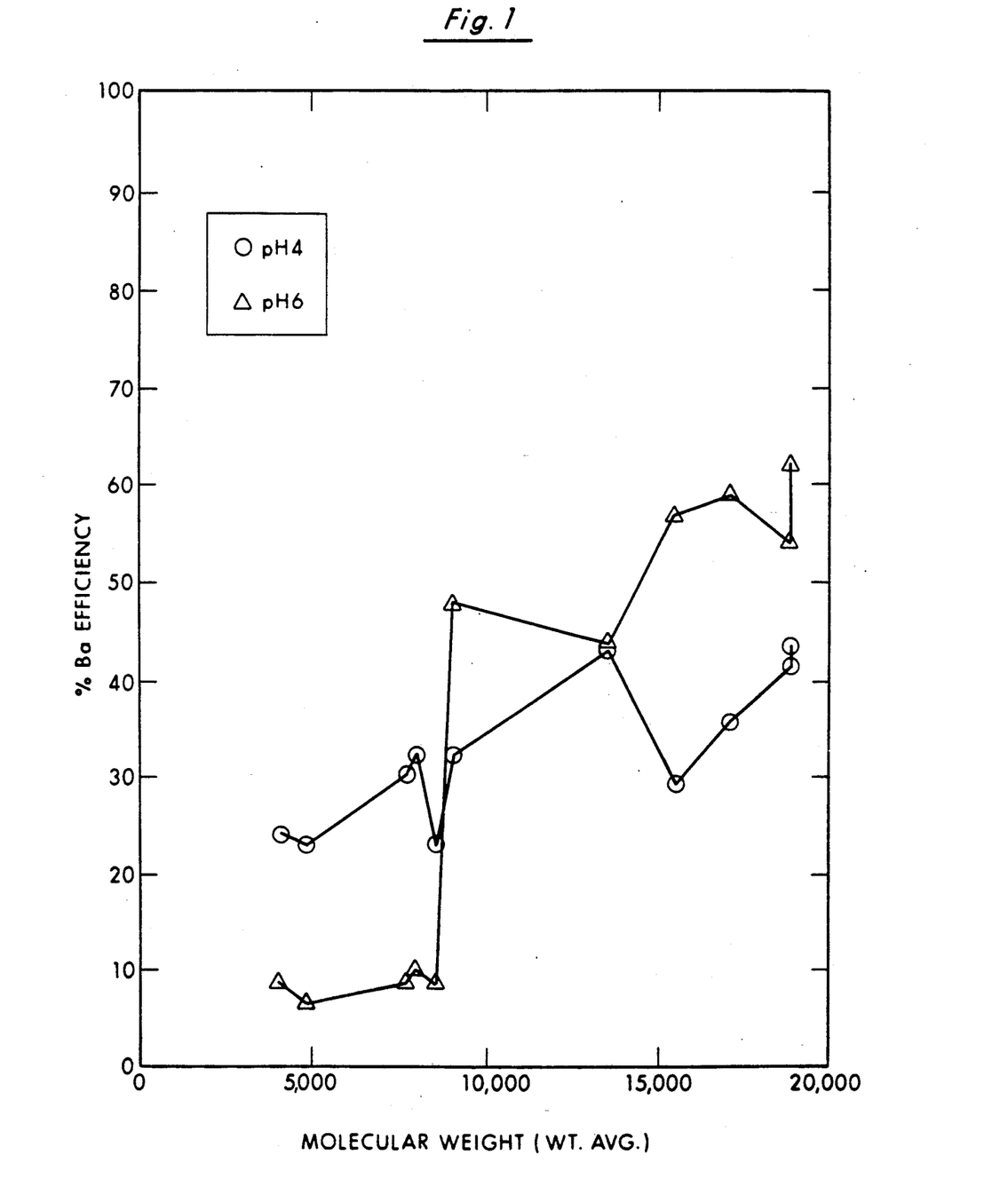
FIG. 1 is a graph illustrating the percent barium efficiency, i.e., barium sulfate scale inhibition, of polyvinyl sulfonate at a pH of 4 and 6 as a function of molecular weight of the polyvinyl sulfonate.

The efficiency of the polyvinyl sulfonates obtained from the procedures demonstrated in Examples 1-6 above in inhibiting barium sulfate scale is determined utilizing the following seeded bottle test procedures. The pH of a brine A having 2.465 g of $CaCl_2.2H_2O$, 5.253 g of $MgCl_2.6H_2O$, 2.177 g of $BaCl_2.2H_2O$, 0.157 g of $SrCl_2.6H_2O$, 3.486 g KCl, and 55.626 g of NaCl per liter is adjusted to a pH of either 4 or 6, depending on the exact pH test being run, by adding hydrochloric acid to lower the pH or sodium hydroxide to raise the pH. 100 ppm of the particular polyvinyl sulfonate obtained in Examples 1-6 above to be tested is added to 100 ml of brine B containing 60.155 g NaCl and 1.597 g of $Na_2SO_4$ per liter. The pH of the resultant brine B mixture is adjusted to either pH 4 or 6, depending on the test to be run, by adding hydrochloric acid to lower the pH or sodium hydroxide to raise the pH. Subsequent mixing of equal volumes of brines A and B simulates an 80% formation or connate water and 20% seawater brine which is representative of an aqueous formation fluid obtained when North Sea seawater is utilized as a drive fluid in a Brae field subterranean formation. The Brae field is located in the United Kingdom section of the North Sea. 0.01 g of barium sulfate, i.e. seed crystals, are added to a screw top glass culture tube. 5.00 ml of brine B (containing inhibitor) are added to the glass tube using a volumetric pipet. 5.00 ml of brine A are added to the glass tube in a similar fashion. The glass tubes are quickly capped and inserted horizontally into a rack in a shaker oil bath which has been preheated to 80° C. The shaker oil bath is activated and the glass tubes are mixed for one hour. This procedure is repeated for each sample to be tested. Each glass tube is removed from the shaker bath and about 2 g of the resulting suspension is removed from the tube into a syringe. The resultant suspension is filtered through a 0.2 micrometer syringe filter to remove solid barium sulfate and approximately 2 g of the filtrate are weighed into a plastic tube containing 5.0 g of deionized water and 0.5 g of basic EDTA solution to chelate the barium contained in the filtrate. The remaining suspension is returned in the glass tube to the shaker bath and mixed for an additional hour. The resultant suspension is again analyzed as above and the filtered samples are analyzed for barium concentrations by ICAP analysis. The percent barium efficiency of the polyvinyl sulfonate inhibitor is calculated by determining the amount of barium ion in the final solution, dividing that amount by the amount of barium ion in the initial brine A+B solution, and multiplying by 100%. The results of this testing are depicted in FIG. 1.

As indicated by these results, use of a polyvinyl sulfonate having a molecular weight greater than about 9,000 results in an unexpected increase in the percent barium efficiency, and therefore inhibition of barium sulfate scale, at a pH of 4 and 6.

EXAMPLE 10

A solution of 3 wt % sodium chloride and 0.15 Molar sodium sulfate ("sulfate brine") was titrated at 25° C. with a solution of 3 wt % sodium chloride and 0.5 Molar barium chloride ("barium brine") to precipitate barium sulfate in accordance with the following reaction:

$$Na_2SO_4 + BaCl_2 \xrightarrow{3\% \ NaCl} BaSO_4\downarrow + 2NaCl$$

The barium brine was added as a titrant to 50 ml of the sulfate brine containing 0.75 mMole sulfate at a rate of 0.00664 ml per sec. for a total period of 290 sec. A total of about 0.96 mMole of barium was added to the sulfate brine resulting in an excess of 0.21 mMole of barium.

Figure 2:
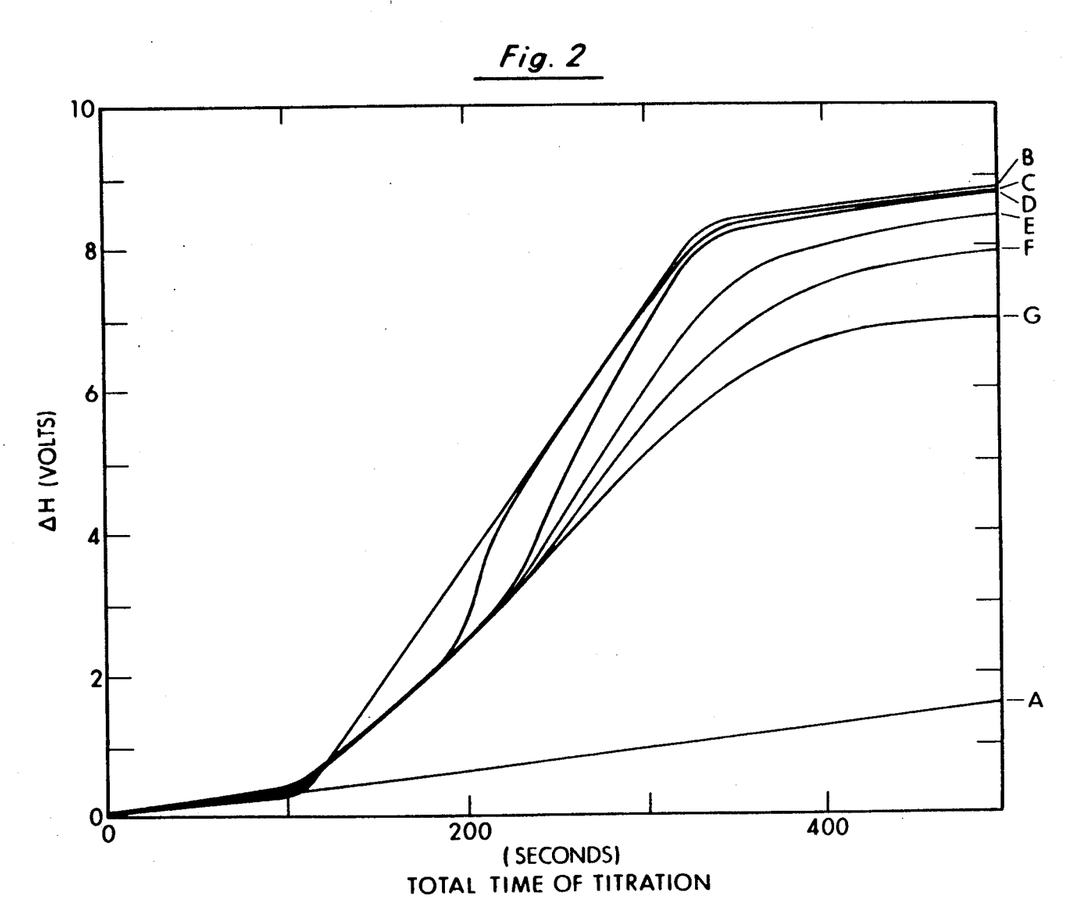
FIG. 2 is a graph illustrating the calorimetric titration curves for an uninhibited and several polyvinyl sulfonate inhibited sulfate brines titrated with barium brine.

A Model 458 isoperibol (adiabatic) calorimeter manufactured by Tronac, Inc. was utilized to perform the titration. This calorimeter includes a 600 RPM synchronous motor which drives a glass stirrer to provide thorough mixing. The results of this titration of sulfate brine with barium brine are illustrated in FIG. 2 as calorimetric titration curve B. Line A represents the heat of stirring and heat of dilution of sodium salts which are determined by adding the barium brine as set forth above to a 3 wt % sodium chloride solution. The total heat of reaction for the titration performed is calculated by extrapolating the slope of the titration curve B for the first 100 seconds of the test, i.e. before addition of barium brine titrant, to time zero and extrapolating the slope of the titration curve B for the last 100 seconds, i.e. after the entire barium brine titrant is added to the sulfate brine, to time zero. The extrapolated readings are subtracted to yield a total heat of reaction for this titration which is expressed in volts. A conversion factor of .491 cal/volt can be applied to convert this heat of reaction to calories.

Utilizing preparative gel permeation chromotography, five separate molecular weight fractions are isolated from a polyvinyl sulfonate having a molecular weight of 14,500 and are collected as Fractions having molecular weights as set forth below.

A premeasured quantity of each polyvinyl sulfonate Fraction is added to separate sulfate brines to inhibit formation of barium sulfate precipitate.

| Fraction | Molecular Weight | Amount Added |
| --- | --- | --- |
| C | 6,971 | 7.58 mg |
| D | 8,175 | 8.17 mg |
| E | 9,275 | 7.69 mg |
| F | 10,975 | 7.46 mg |
| G | 25,992 | 7.63 mg |

Figure 3:
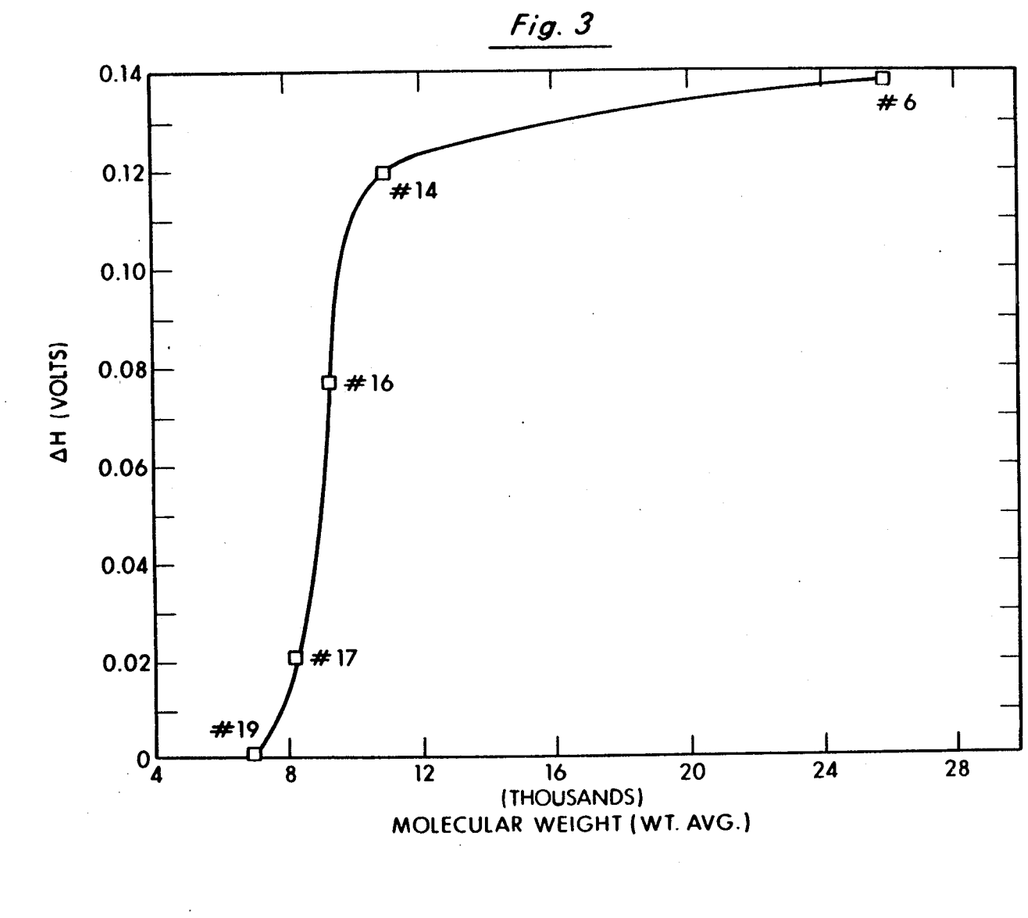
FIG. 3 is a graph indicating the change in heat of reaction for each of the several polyvinyl sulfonate inhibited sulfate brines which are titrated with barium brine.

Each resultant inhibited sulfate brine is titrated with barium brine in the manner set forth above and the resulting thermometric titration curves are plotted in FIG. 2 and respectively labeled as curves C-G. By the method set forth above with respect to titration B, the total heat of reaction for each titration C-G is calculated and is subtracted from the total heat of reaction for titration B to yield a change in the heat of reaction which indicates the amount of reaction, and therefore barium sulfate precipitation, which is inhibited by each polyvinyl sulfonate Fraction. These results are plotted and appropriately referenced in FIG. 3. As indicated by these results, use of a polyvinyl sulfonate having a molecular weight above about 9,000 to about 26,000 results in an unexpected decrease in the amount of reaction.

EXAMPLE 11

Figure 4:
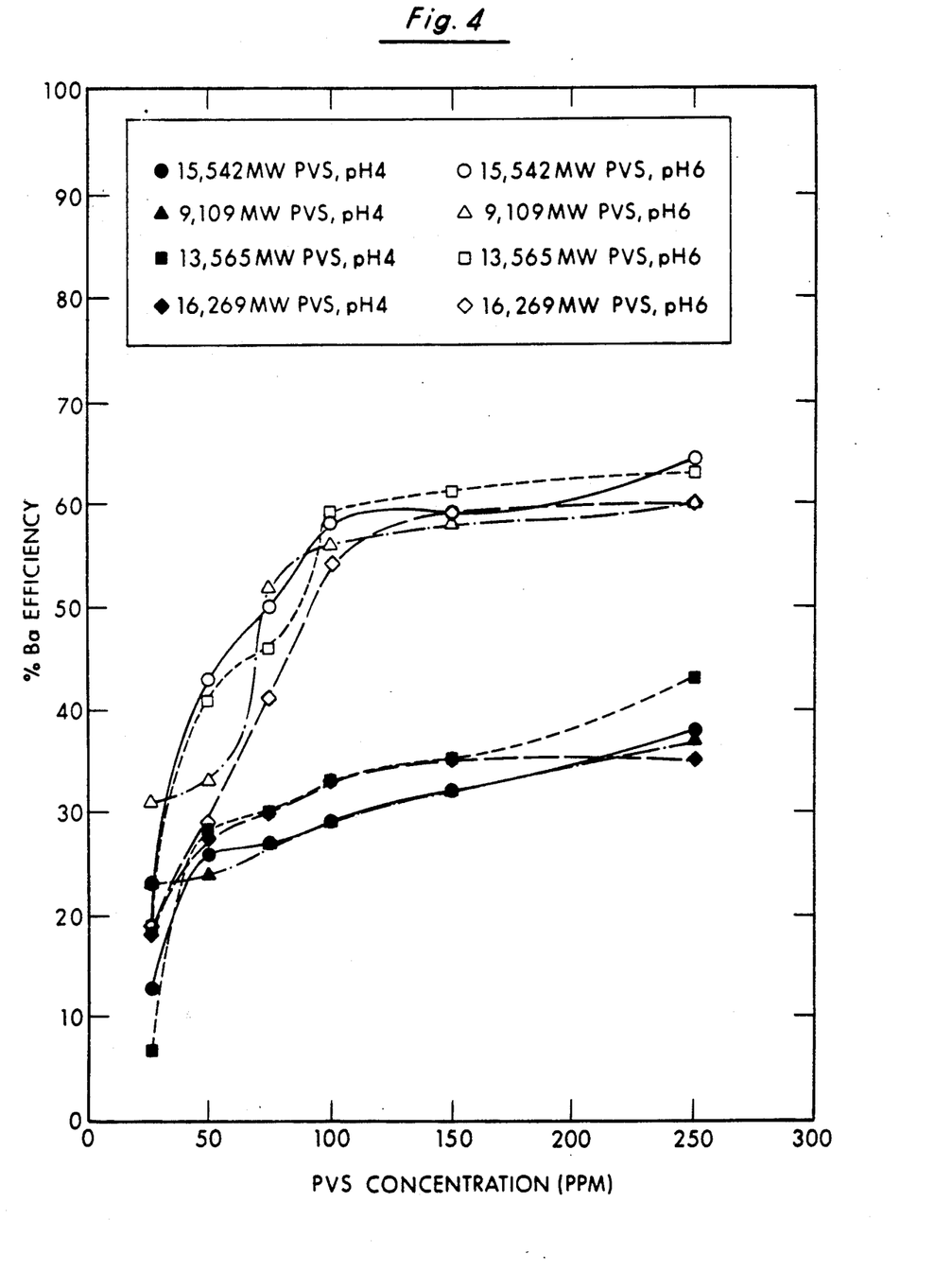
FIG. 4 is a graph of the percent barium efficiency, i.e., barium sulfate scale inhibition, of differing molecular weight polyvinyl sulfonates at a pH of 4 and 6 as a function of the concentration of polyvinyl sulfonate.

The seeded bottle test procedure set forth in Example 9 above was repeated at six different concentrations and at a pH of 4 and 6 for each of the polyvinyl sulfonates obtained from the procedures demonstrated in Examples 1–4 above. The results which are depicted in FIG. 4 demonstrate that the concentration of polyvinyl sulfonate scale inhibitor of the present invention in an aqueous fluid in which the formation of scale is to be inhibited should be at least about 50 ppm, more preferably at least about 75 ppm, and most preferably at least about 100 ppm to result in the unexpected increase in the percent barium efficiency at a pH of 4 and 6 of the process of the present invention.

It is important to note that an aqueous solution containing the polyvinyl sulfonate scale inhibitor of the present invention does not dissolve calcium carbonate scale to any appreciable degree when injected into a subterranean formation via a production well bore. Accordingly, the presence of calcium carbonate scale in a production well bore or the near well bore environment of a formation does not adversely affect the efficiency of the polyvinyl sulfonate scale inhibitor of the present invention. Further, it has been determined that the polyvinyl sulfonate scale inhibitor of the present invention has a significantly greater degree of inhibition of barium sulfate scale on calcium carbonate seeds than conventional polyphosphonate or polycarboxylate scale inhibitors.

While the foregoing preferred embodiments of the invention have been described and shown, it is understood that the alternatives and modifications, such as those suggested and others, may be made thereto and fall within the scope of the invention.

We claim:

1. A process for inhibiting scale including barium sulfate in aqueous fluid having a pH equal to or less than about 6.0 and being present in or produced from a subterranean formation, the process comprising:
    contacting said aqueous fluid with an amount of a polyvinyl sulfonate which is effective to inhibit formation of said scale in said aqueous fluid, said polyvinyl sulfonate having a molecular weight of from about 10,500 to about 30,000.

2. The process of claim 1 wherein said aqueous fluid has a pH of about 4.0 or less.

3. The process of claim 1 further comprising:
    injecting an aqueous solution having said polyvinyl sulfonate dissolved therein into said subterranean formation via a well bore in fluid communication with said subterranean formation, said polyvinyl sulfonate being absorbed within a matrix of said subterranean formation, said step of contacting being performed as said polyvinyl sulfonate is desorbed from said matrix into said aqueous fluid.

4. The process of claim 3 wherein said polyvinyl sulfonate is dissolved into said aqueous solution in an amount of from about 0.4 to about 25 volume percent of the solution.

5. The process of claim 4 wherein said polyvinyl sulfonate is dissolved into said aqueous solution in an amount of from about 2 to about 20 volume percent of the solution.

6. The process of claim 5 wherein said polyvinyl sulfonate is dissolved into said aqueous solution in an amount of from about 5 to about 10 volume percent of the solution.

7. The process of claim 3 further comprising:
    determining the concentration of polyvinyl sulfonate in said aqueous fluid produced from said subterranean formation.

8. The process of claim 7 wherein said concentration of polyvinyl sulfonate in said aqueous fluid produced from said formation is determined to be below a predetermined value, the process further comprising:
    repeating said injection of said aqueous solution having polyvinyl sulfonate dissolved therein into said subterranean formation.

9. The process of claim 8 wherein said predetermined value is 50 ppm.

10. The process of claim 8 wherein said predetermined value is 75 ppm.

11. The process of claim 8 wherein said predetermined value is 100 ppm.

12. The process of claim 3 further comprising:
    injecting a second aqueous solution into said subterranean formation via said well bore to displace said aqueous solution having polyvinyl sulfonate dissolved therein.

13. The process of claim 12 wherein said well bore is a production well bore, said process further comprising:
    shutting in said well bore for a predetermined period of time subsequent to said step of injecting said second aqueous solution.

14. The process of claim 3 wherein said aqueous solution is a brine.

15. The process of claim 14 wherein said brine contains sulfate ions.

16. The process of claim 3 further comprising:
    removing deleterious by-products of sulfonation from said aqueous solution prior to said contacting step.

17. The process of claim 3 wherein said polyvinyl sulfonate has a molecular weight of from about 10,500 to about 25,000.

18. The process of claim 3 wherein said polyvinyl sulfonate has a molecular weight of from about 12,000 to about 20,000.

19. The process of claim 3 wherein said polyvinyl sulfonate has a polydispersity of less than about 2.0.

20. The process of claim 1 wherein said aqueous fluid has carbon dioxide dissolved therein.

21. The process of claim 1 wherein said polyvinyl sulfonate has a molecular weight of from about 10,500 to about 25,000.

22. The process of claim 1 wherein said polyvinyl sulfonate has a molecular weight of from about 12,000 to about 20,000.

23. The process of claim 1 wherein said polyvinyl sulfonate has a polydispersity of less than about 2.0.

24. The process of claim 1 wherein said step of contacting is performed by metering an aqueous solution having said polyvinyl sulfonate dissolved therein through a small diameter tube positioned within a well bore in fluid communication with said subterranean formation and into said aqueous fluid present in said well bore.

25. The process of claim 24 wherein said polyvinyl sulfonate has a molecular weight of from about 10,500 to about 25,000.

26. The process of claim 24 wherein said polyvinyl sulfonate has a molecular weight of from about 12,000 to about 20,000.

27. The process of claim 24 wherein said polyvinyl sulfonate has a polydispersity of less than about 2.0.

28. The process of claim 24 wherein said aqueous solution is a brine.

29. The process of claim 28 wherein said brine contains sulfate ions.

30. The process of claim 24 further comprising: removing deleterious by-products of sulfonation from said aqueous solution prior to said contacting step.

31. The process of claim 24 wherein said amount is at least about 50 ppm.

32. The process of claim 1 wherein said process further comprises:
 injecting said polyvinyl sulfonate into a well bore in fluid communication with said subterranean formation, said polyvinyl sulfonate being encapsulated prior to injection.

33. The process of claim 32 wherein said polyvinyl sulfonate has a molecular weight of from about 10,500 to about 25,000.

34. The process of claim 32 wherein said polyvinyl sulfonate has a molecular weight of from about 12,000 to about 20,000.

35. The process of claim 32 wherein said polyvinyl sulfonate has a polydispersity of less than about 2.0.

36. The process of claim 32 wherein said amount is at least about 50 ppm.

* * * * *